Patented Aug. 2, 1938

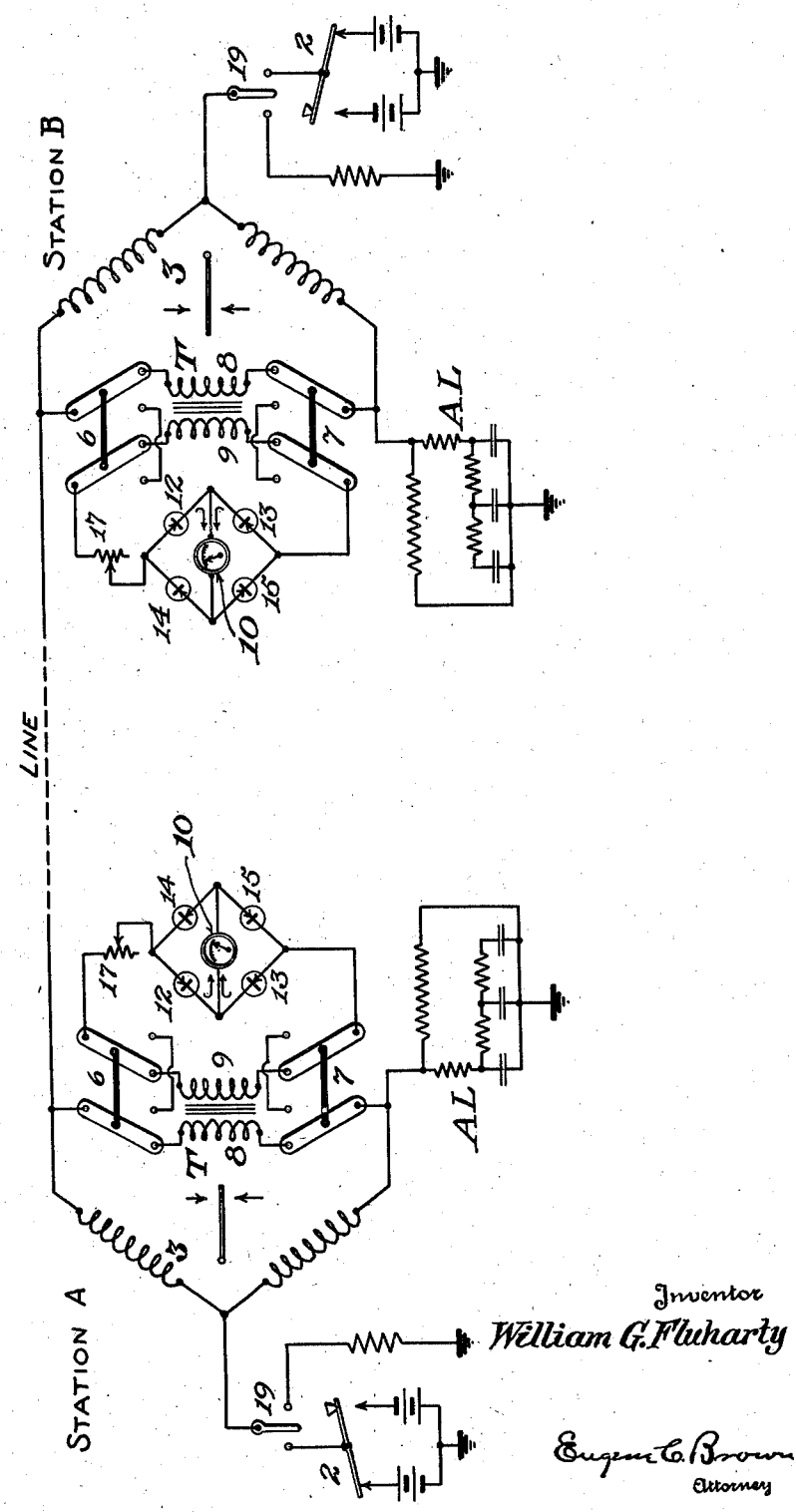

2,125,670

UNITED STATES PATENT OFFICE 2,125,670

DUPLEX BALANCE INDICATOR

William G. Fluharty, Rockville Centre, N. Y., assignor to The Western Union Telegraph Company, New York, N. Y., a corporation of New York Application June 19, 1936, Serial No. 86,181

3 Claims. (Cl. 178—69)

This invention relates to system for the balancing of the real line and the artificial line of duplex communicating systems, such as the usual bridge or differential duplex telegraph system.

As is well known in the art, a balance must be maintained between a real line and an artificial line in order that reception of signals over a duplex telegraph circuit may be undisturbed. The electrical characteristics of the real line vary over a wide range due to changes in weather and atmospheric conditions, and it is necessary to adjust the artificial line, from time to time, to maintain the correct balance. The artificial line is made up of a plurality of variable resistances to balance the resistance of the line and a plurality of variable condensers with variable resistances in series with them, to balance the capacity of the line. There also may be in the artificial line one or more fixed condensers with or without resistances in series with them. In some cases there may be either a fixed or variable inductance inserted in the artificial line. The artificial line is thus constructed to contain within its limits of variation some combination of resistance, capacity and inductance which will closely simulate the real line which it is to balance.

The square topped signal wave employed for telegraph transmission is composed of a considerable number of sine wave attenuating currents of gradually increasing multiples of the fundamental frequency, with a gradual decrease in amplitude for all frequencies above the fundamental. In commercial telegraph systems, the fundamental frequency may be as high as one hundred cycles or more in cases of automatic sending and reception by automatic printing machines, so that the accompanying harmonics are of relatively high frequency.

The impedance of the line presented by the inductance is greater with the higher frequencies while the impedance of the distributed capacity decreases with increased frequencies so that the inductance tends to suppress the high frequency currents and the shunt capacity to conduct them to ground, and thus remove the higher harmonics from the block signals. Since the higher harmonics give form to the block signal their partial removal causes a distortion of the signals.

In balancing the artificial line and the real line, the elements of the artificial line must be adjusted to simulate the loss of these higher frequency components. However, difficulty has been experienced, heretofore, in obtaining an accurate balance of the line since the instruments available for measuring the degree of unbalance, if sufficiently sensitive, have too large a moment of inertia, or power absorption to register these higher frequency currents, while the more rapid instruments are too low in sensitivity to register the weaker high frequency currents.

Most telegraph lines and submarine cables are subject to interference or disturbing currents to a greater or less degree; particularly is this so on ground return circuits and on cables which parallel other working circuits. These interference currents are for the most part caused by magnetic and static coupling between the conductors and are composed of all possible frequencies from the lowest to the highest present in the disturbing circuits.

The incidental damping of ordinary meters employed to indicate the degree of unbalance is usually sufficient to eliminate pointer fluctuations caused by interfering currents of higher rate, but the lower interfering frequencies, which are variable, cause the meter pointer to oscillate in an erratic and variable manner which interferes with and makes more difficult the reading of the legitimate out-of-balance currents. In an endeavor to overcome pointer fluctuations due to the lower interfering frequencies, it has been the usual practice to employ highly damped galvanometers or meters although this caused the movement of the pointer to be too slow for accurate or rapid balancing operations.

One object of my invention is to overcome the objections to the highly damped meter heretofore employed and to provide an instrument having characteristics which cause the pointer of the meter to take a position on the scale proportional to the amplitude of the interference currents. For this purpose I provide the usual damping means built into the meter, adjusted so that variations of current amplitudes at high rates or frequencies cause no perceptible oscillation of the meter pointer and have found that when the degree of meter damping is adjusted so that current variations of five or six cycles per second or less produce a minimum oscillation of the pointer, this is sufficient for practical use. Then when both ends of the line are grounded through their respective sets, there may be a slow but limited oscillation of the pointer which may be readily interpolated by the eye to accurately determine the interference level of the circuit. When taking a balance reading during the transmission of currents, any out-of-balance currents produced by incomplete adjustments of the artificial line, cause the meter pointer to move higher on the scale. The difference between the two aforementioned readings is a measure of the unbalance. The damping characteristics provided as above specified facilitate more accurate indications and adjustments of the artificial line and enhance the ease with which observations may be made and also greatly shorten the time required to make these adjustments.

The usual procedure when adjusting the balance of a duplex telegraph circuit is to have the distant attendant ground his end of the line through the balance ground resistance, i. e., a resistance which compensates for battery tap resistance, which is an essential, so that the ohmic resistance of the line circuit is practically the same whether the distant end is on battery or on balancing ground. The purpose of grounding the distant end of the circuit is to prevent the presence of any currents in the home relay and the balance indicator except those caused by interference and out-of-balance conditions.

Another object of my invention is to provide means for obtaining balance indications without the necessity for grounding at the distant end of the line. Since the telegraph circuit is composed of distributed resistance and inductance in series, with distributed capacities and leak resistances in shunt, the amplitude or value of received currents is greater for lower frequencies than for higher frequencies. Thus, received telegraph signals, because of the presence of various frequencies, result in fluctuations of amplitude. On account of these fluctuations, variable drifting of the balance indicator pointer precludes conducting balancing operations while the distant end is transmitting. But, when the distant end transmits only direct current of a single polarity the amplitude of the received current is constant, except of course, for those current variations caused by interference. The advantages to be derived from balancing in this manner are apparent when it is considered that it is not always convenient to ground the distant terminal before conducting balancing operations. Delay and consequent lost wire time may be incurred because the distant attendant may not be available or free at the time to ground his end of the circuit, but it is always possible to stop and start transmission at the distant station by request or by prearranged signals. This is a decided advantage on long circuits having one or more repeaters. For if the distant terminal be stopped, all intermediate repeater transmissions are stopped and direct current, usually of the same polarity, transmitted by the distant terminal is retransmitted in turn through each repeater. Thus direct current of the same polarity is received at the home station.

It has been proposed to prevent the passage of direct current through the balancing meter by interposing a condenser. Condenser coupling, however, is objectionable on account of the large change in impedance for changes in current frequency. Moreover, a separate meter was required to be direct-connected for resistance balancing.

I have found that a proper inductive coupling of the meter overcomes the faults inherent in capacity, or condenser coupling, and possesses other advantages not found in prior methods of balancing duplex circuits. It is evident that the meter will not be affected by direct current in the primary of the coupling transformer and hence static balances may be taken when a steady direct current from the distant station is flowing on the line. Consequently it is not necessary to have the distant operator ground the line but merely to stop transmitting for a moment while the home operator reads his meter.

The interposition of a transformer provides other advantages over capacity coupling and the other prior arrangements. The transformer may be designed to have the desired impedance matching characteristics and to vary the sensitiveness of the meter. I have found that the best and most sensitive operation of the balance indicator is secured when the ratio of the turns of the primary and secondary coils and the impedances are such that, as far as practicable, the deflection of the meter is practically the same whether the transformer is interposed or whether the balance indicator is connected direct to the lines.

To explain the invention more in detail I shall refer to the accompanying drawing showing a diagram of a duplex circuit illustrating one embodiment of my duplex balancing indicator.

I have shown in conventional form a circuit arrangement representing a simple duplex telegraph system extending between two stations A and B, each provided with transmitting apparatus 2 and a line relay 3 of the differential type. The coils of the coupling transformer T are connected to switches 6 and 7. In the position shown, the primary coil 8 is connected between the line and the artificial line AL and the meter 10 is connected to the secondary coil 9. When the switches are moved to the other position, the transformer coils are disconnected and the meter is connected directly between the real line and the artificial line. The balance indicating meter 10 is connected through a full wave rectifier having rectifying elements 12, 13, 14 and 15 in bridge arrangement so that all current waves flow through the operating element of the meter in the same direction. An adjustable rheostat 17 may be employed to vary the sensitivity of the meter.

The usual procedure when adjusting the balance of a duplex telegraph circuit is to have the distant operator ground his end of the line. When the home operator then grounds his end through the switch 19, and connects the meter 10 direct by throwing switches 6 and 7 to the right, any interference currents will cause the pointer of the meter 10 to take a position on the scale proportional to the amplitude of the interference currents. In order to prevent violent fluctuations of the pointer or needle of the meter, it has been the practice to use a highly damped meter. This not only interferes with rapid readings, the movement of the pointer being too slow for ordinary use, but also prevents accurate determination of the current waves which cause interference in the telegraph range. I have found that meters damped to five or six cycles or less per second permit a slow but limited oscillation of the pointer which may be interpolated by the eye when taking readings. The meter deflections, when both ends of the line are grounded through their respective sets may be regarded as the interference level of the circuit. If now transmission currents are sent by the home operator, any out-of-balance currents caused by incomplete adjustments of the artificial line, cause the meter pointer to move still higher on the scale. Differences between the two aforementioned readings is a measure of the unbalance.

As noted above, my balance indicator may be used to adjust the ohmic balance by throwing the switches 6 and 7 to the right, thereby connecting the meter direct to the real and artificial lines. When connected in this manner the meter is sensitive to direct current as well as alternating currents. When the operator at the distant end of the line stops transmission by request or by prearranged signals, the operator at the home station grounds his end momentarily. The meter pointer then takes a position due to the direct current from the distant end and with the slow oscillations produced by the interference currents. When the home operator transmits signals, the meter pointer will move still higher on the scale, if there are any out-of-balance currents caused by incomplete adjustments of the artificial line. The resistance of the artificial line is then adjusted until there is a minimum of movement of the pointer, which indicates a correct resistance balance.

To adjust for static unbalance, the switches 6 and 7 are thrown to the left into the position shown, thereby connecting the meter to the real and artificial lines through the transformer. The direct current from battery at the distant end is thereby eliminated from the meter. When the home operator grounds the line by moving the switch 19 to the right, the meter pointer will then take a position on the scale proportional to the amplitude of the interference currents. When the switch 19 is moved to the left and signaling currents are sent from the transmitter 2, any out-of-balance currents caused by incomplete adjustments of the elements of the artificial line will cause the meter pointer to move higher upon the scale. The condensers and retard resistances of the artificial line are then adjusted until the pointer moves back to the position due to the interference currents.

The advantages of my method of obtaining indications of unbalance between the real and artificial lines will be appreciated by telegraph engineers. By providing the meter with damping characteristics which limit the oscillations of the pointer to a slow movement within a narrow range, such as five or six cycles per second, the pointer deflection indicates the average envelop of the interference or induction currents, so that the time required to make the adjustments for unbalance is greatly shortened and more accurate indications and adjustments of the artificial line may be made on account of the ease with which observations may be made.

By employing an inductive coupling between the lines and the balance indicator, the variation in impedance due to frequency changes is practically eliminated by properly designing the coupling transformer, and the turn ratios and impedances of the coils may be so chosen that the response of the indicator to unbalanced conditions is sensitive and accurate. I have found that the best and most sensitive operation of the balance indicator or meter is secured when the turn ratios of the coupling transformer and impedances are such that the deflection of the meter is practically the same whether the transformer is interposed or whether the meter is connected direct to the real and artificial lines.

I have illustrated only one form of balance indicator for the purpose of disclosing my invention, but I wish it to be understood that other forms and other types of single wave or full wave rectifiers may be employed, such as those shown in my prior Patent No. 1,802,244, in connection with a direct current meter, and also with different types of meters and galvanometers. So also meters of the dynamometer type and magnetic repelling vane type, sensitive to both direct and alternating currents may be substituted for the rectifier meter illustrated, provided they are adjusted to the requisite sensitivity in both current or voltage magnitude and frequency requirements. Instead of using currents of two polarities, I may employ interrupted currents of unipolarity for make and break transmission, such as used on the original Stearn's duplex system.

I claim:—

1. A balance indicator for determining the out-of-balance current of a duplex telegraph system employing signals of changing polarity, comprising a meter, a full wave rectifier connected to deliver the out-of-balance currents of both polarities to the operating element of said meter as uni-directional current, a transformer for transmitting the variable voltage components of said out-of-balance currents to said rectifier and switching means to disconnect the transformer and connect the rectifier direct to the real line and an artificial line of the duplex system.

2. A balance indicator for determining the out-of-balance current of a duplex telegraph system employing signals of changing polarity, comprising a meter, full-wave rectifying means connected to the operating element of said meter and a transformer connected to deliver the out-of-balance currents of both polarities to said rectifying means.

3. A balance indicator for determining the out-of-balance current of a duplex telegraph system employing signals of changing polarity, comprising a meter, full-wave rectifying means connected to the operating element of said meter and a transformer connected to deliver the out-of-balance currents of both polarities to said rectifying means, said meter being provided with an oscillatable pointer, and damping means applied to said meter to cause said pointer to oscillate slowly and to limit the oscillations to a predetermined range.

WILLIAM G. FLUHARTY.